US009648255B2

(12) United States Patent
Chenderovich et al.

(10) Patent No.: US 9,648,255 B2
(45) Date of Patent: May 9, 2017

(54) MULTI-MODAL OPTOELECTRONIC VISION SYSTEM AND USES THEREOF

(71) Applicant: GSCI, Woodbridge (CA)

(72) Inventors: Simon Chenderovich, Richmond Hill (CA); Ivan Petrov, Toronto (CA)

(73) Assignee: General Starlight Co., Inc., Woodbridge, Ontario (CA)

( * ) Notice: Subject to any disclaimer, the term of this patent is extended or adjusted under 35 U.S.C. 154(b) by 0 days.

(21) Appl. No.: 14/852,283

(22) Filed: Sep. 11, 2015

(65) Prior Publication Data

US 2017/0078591 A1   Mar. 16, 2017

(51) Int. Cl.
| | |
|---|---|
| *H04N 5/33* | (2006.01) |
| *H04N 5/225* | (2006.01) |
| *H04N 5/262* | (2006.01) |
| *H04N 5/235* | (2006.01) |
| *H04N 5/232* | (2006.01) |
| *H04N 5/265* | (2006.01) |
| *H04N 5/04* | (2006.01) |

(52) U.S. Cl.
CPC ............. *H04N 5/332* (2013.01); *H04N 5/04* (2013.01); *H04N 5/2252* (2013.01); *H04N 5/2256* (2013.01); *H04N 5/2351* (2013.01); *H04N 5/23241* (2013.01); *H04N 5/23293* (2013.01); *H04N 5/265* (2013.01); *H04N 5/2621* (2013.01)

(58) Field of Classification Search
IPC .................................................... H04N 5/332
See application file for complete search history.

(56) References Cited

U.S. PATENT DOCUMENTS

| | | | | |
|---|---|---|---|---|
| 4,516,167 | A * | 5/1985 | Dion .................... | H04N 5/20 348/672 |
| 4,878,128 | A * | 10/1989 | Yasumura .............. | H04N 5/772 386/227 |
| 5,995,143 | A * | 11/1999 | Price .................... | G02B 21/244 348/345 |
| 6,646,799 | B1 * | 11/2003 | Korniski ................. | G01J 3/02 359/350 |
| 8,836,793 | B1 | 9/2014 | Kriesel et al. | |
| 9,386,230 | B1 * | 7/2016 | Duran ................... | H04N 5/2351 |
| 2002/0015536 | A1 * | 2/2002 | Warren .................. | G06T 5/50 382/284 |
| 2004/0218099 | A1 * | 11/2004 | Washington ............ | H04N 5/77 348/571 |
| 2007/0103773 | A1 | 5/2007 | Schwartz, II et al. | |
| 2007/0228259 | A1 | 10/2007 | Hohenberger | |
| 2009/0058881 | A1 | 3/2009 | Ottney | |
| 2010/0208372 | A1 * | 8/2010 | Heimer ................. | G01J 3/02 359/834 |
| 2013/0188056 | A1 | 7/2013 | Heimer | |
| 2015/0051498 | A1 | 2/2015 | Darty | |

FOREIGN PATENT DOCUMENTS

CA      2470070 C      7/2003

* cited by examiner

*Primary Examiner* — Tracy Y Li
(74) *Attorney, Agent, or Firm* — Guy Levi; The IP Law Firm of Guy Levi, LLC

(57) ABSTRACT

The disclosure relates to assemblies, kits and methods for multi-mode optoelectronic observation and sighting system with cross-platform integration capability. More particularly, the disclosure relates to assemblies, kits and methods facilitating the analog fusion of VNIR and LWIR image sensors' data to a single, coherent display.

20 Claims, 2 Drawing Sheets

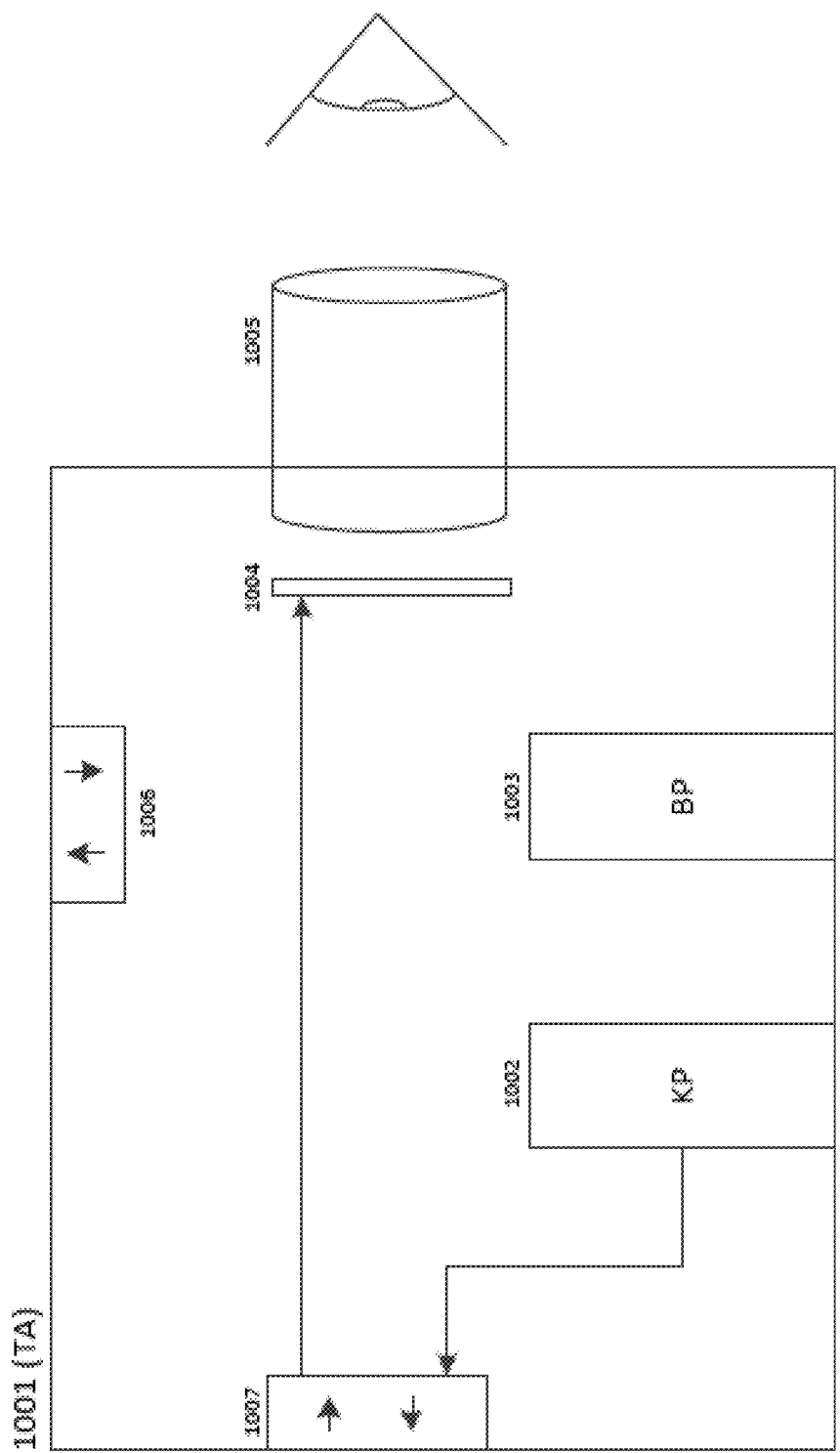

MULTI-MODAL OPTOELECTRONIC VISION SYSTEM AND USES THEREOF

BACKGROUND

The disclosure is directed to a multi-mode optoelectronic observation and sighting system with cross-platform integration capability.

Due to its core principle of operation, in other words, intensifying existing light, night vision technology has its limitations. For example; inability to detect objects/targets when there is no ambient light available and/or when the object is camouflaged or when the image is obstructed with foliage, smoke, fog or camouflage net.

Operation of a LWIR thermal imaging sensor is based on retrieving and processing long-wave infrared radiation signal and converting it into a visible video image. Although it does not require any visible light to successfully operate, a thermal imager still cannot detect objects if their temperature is the same as that of the environment. Likewise it cannot sense and record any information about an object if that object is located behind a medium or barrier that does not transmit infrared (IR) radiation, such as conventional glass.

A complementary combination of a daytime camera, a thermal imaging and night vision devices that substantially eliminate the vulnerabilities of each individual system and significantly increases user's scene comprehension and situation awareness is therefore desired. However portable, lightweight, and cost-effective real-time and lag-free overlay of different video channels input that will achieve this is yet to be made.

For example, US Publication No US2007/0103773A1, is directed to fusion night vision system with image intensification and infrared imaging capabilities. The disclosed technology is achieved using dichoptic stimulation (i.e. brain fusion), Optical overlay using beam splitter/combiner, and digital fusion. Similarly, US Publication No US2007/0228259A1, is directed to a system and method for fusing an image. The features disclosed involve digital or analog fusion mixer (with no further disclosure of how this proposed approach is to be implemented into fully operable apparatus), parallax compensation circuit coupled to the display and digital image resizing.

Also, US Publication No US2009/0058881A1, which is directed to a fusion night vision system with parallax correction, discloses digital fusion, which is not cost-effective.

Moreover, Canadian Application CA02470070-2008-09-10, directed to video-enhanced night vision goggles discloses video scaling and fusing in a digital way using field-programmable gate array (FPGA). The invention uses an $I^2$ Tube coupled to a CMOS camera via a micro-channel interface.

Furthermore, U.S. Pat. No. 8,836,793 directed to true colour night vision fusion, uses beam splitter for VNIR and LWIR separation and preserves the colour information of the VNIR channel while the LWIR channel video image is being processed for edge detection whilst LWIR video processing is done digitally.

Accordingly, the available instruments and technology is based on Brain fusion (dichoptic stimulation)—each eye receives separate video image (LWIR or VNIR) and fusing is done in the operator's brain, therefore cannot be used in monocular devices or any display (e.g., LCD); on Beam splitter/combiner (optical overlay), which is prone to parallax issues with the eye position according to the eyepiece, since both images are not projected on the same plane. Furthermore, beam combining also increases the size of the device by adding the extra needed optics and also adds to the costs. Finally, the available technology uses Digital processing—very precise and versatile, but has increased cost due to the need of fast digital processing ICs, frame buffering, etc. Digital processing may also introduce latency if the video processing unit is of a lower speed.

There is therefore a need for a multi-mode optoelectronic observation and sighting system with cross-platform integration capability, which does not introduce any latency, where the signals are mixed real-time on the fly without frame buffering, can be displayed on bi- and/or monocular devices and screens and offer lowered cost of the solution.

SUMMARY

Disclosed, in various embodiments, are assemblies, systems and kits of multi-mode optoelectronic observation and sighting system with cross-platform integration capability; and methods analogously fusing two composite analog video signal.

More specifically, provided herein is a system for providing and supporting analog electronic mixing of a scene-captured composite video signals from two channels (VNIR, LWIR) and one on-screen display (OSD) video signal, with the aid of camera synchronization, wherein both channels are synchronized, having one of the cameras (e.g., VNIR or LWIR) as a master and the other one as a slave. The slave camera is capable of having its timing synchronized to the timing of the master via a synchronization linking means (in other words, operably coupled to provide electronic communication). The source of the synchronization is the video signal produced by the master capturing device. Moreover, the master-slave relation can be altered (or reversed), so in one embodiment, the master could be the VNIR and the slave—the LWIR camera; and in another embodiment, the master can be the LWIR camera, and the slave—the VNIR camera. Successful overlapping of the captured scene (and subsequent display comprising both scenes) requires the same field of view (FOV), size (or span) of the captured scene. In an embodiment, this can be achieved by using a varifocal (VF) lens on the VNIR camera. The VF lens can be adjusted under certain circumstances so the size of image representing the captured scene, produced by the VNIR channel, matches the size of the image representing the scene captured by the LWIR channel. Alternatively, instead of the VF on the VNIR camera, a VF lens can be used on the LWIR camera channel.

In an embodiment provided herein is a lightweight, portable imaging system comprising: a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the VNIR image sensor, the LWIR image sensor, the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal.

In another embodiment, provided herein is a method of analogously fusing two composite analog video signals to display visual images to a human observer, implementable in a system comprising a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the VNIR image sensor, the LWIR image sensor, the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal, the method comprising: using the VNIR imaging sensor and the LWIR imaging sensor capturing a scene and generating an analog composite video signal from each of the VNIR imaging sensor and the LWIR imaging sensor; using the synchronizing linking means, synchronizing the timing of the VNIR composite video signal to the LWIR composite video signal timings; correcting image parallax; separately colorizing the video signal obtained from the VNIR image sensor and the video signal obtained from the LWIR image sensor; using the analog video mixer, analogously mixing the separately colorized video signal obtained from the VNIR image sensor and the video signal obtained from the LWIR image sensor; feeding the mixed video signal to a video encoder; and using the video display, displaying the mixed video signals.

In yet another embodiment, provided herein is a kit comprising: a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the VNIR image sensor, the LWIR image sensor, the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal; optionally packaging; and optionally instruction, wherein the kit capable of being assembled to a multi-mode optoelectronic observation and sighting system with cross-platform integration capability.

These and other features of the assemblies, kits and methods for the multi-mode optoelectronic observation and sighting system with cross-platform integration capability, will become apparent from the following detailed description when read in conjunction with the figures and examples, which are exemplary, not limiting.

BRIEF DESCRIPTION OF THE FIGURES

For a better understanding of the assemblies kits and methods for multi-mode optoelectronic observation and sighting system with cross-platform integration capability described, with regard to the embodiments thereof, reference is made to the accompanying examples and figures, in which:

FIG. 2 illustrates the Transforming Attachment (TA) accessory, which converts the device to a standalone autonomous portable unit.

DETAILED DESCRIPTION

Figure 1:
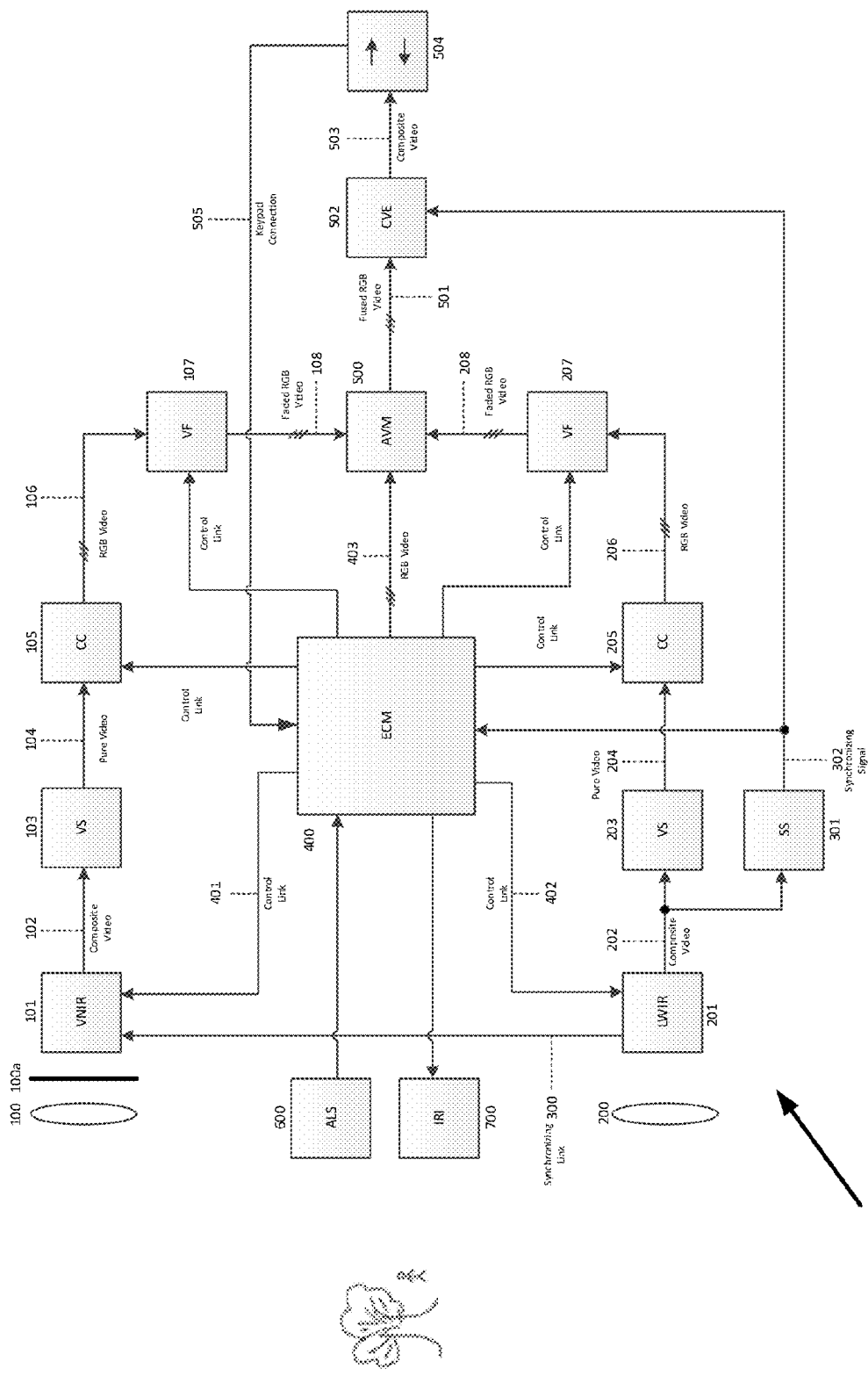
FIG. 1 illustrates a schematic view of the system's components architecture and their interrelationship.

Provided herein are embodiments of assemblies, systems and kits for a multi-mode optoelectronic observation and sighting system with cross-platform integration capability and methods for analogously fusing two composite analog video signals.

In an embodiment, provided herein is a multi-mode optoelectronic observation and sighting system with cross-platform integration capability. The system can generate and display an array of vision modes (e.g., infrared mode, day mode, or night mode), each dedicated to a particular range of wavelengths of incoming electromagnetic radiation. The system can produce real-time collimated video signal that precisely superimposes all vision modes and feeds to a display available to a human viewer. Superposition, fusion or overlay of modes can be analog-electronic and involve synchronization. It can achieve close to 100% detection of objects regardless of temperature differential and lighting conditions. The device can further be equipped with integrated configurable rangefinder module and configured to be provided in a compact, light-weight, ruggedized, and sealed enclosure for outdoor storage and active use and all at relatively low cost.

Moreover, system functions and settings allow the user to swiftly adapt to changes in lighting, temperature, and/or weather conditions for optimal observing, aiming and/or detecting performance. Likewise, cross-platform integration capabilities allow end users to independently and selectably configure, adjust, and customize the system. The system can also be configured to allow end users to perform on-the-go calibration should the unit need to be transferred from the original platform, for example, being vehicle mounted; to a new one, for example, being hand-held or weapon mountable.

In an embodiment, the system can be configured to operate on external power supply or run autonomously with internal power source. A person skilled in the art would readily recognize that the external power source does not necessarily need to be inside the housing, or for that matter, dedicated to the device. The external power source can be, for example, a vehicle battery, an electric generator, a portable battery pack, the electric power grid and the like power sources currently known or later developed.

In another embodiment, the system provided herein can comprise a charge-coupled device (CCD), camera, a thermal imaging unit (microbolometer FPA) and an IR illuminator. The system can have two or more channels that retrieve electromagnetic radiation of different wavelengths for example, one channel configured to sense and capture a scene at wavelengths between about 380 nm and about 750 nm (e.g., VNIR image sensor), and a second channel configured to sense and capture a scene at wavelengths between about 7 μm and about 14 μm (e.g., LWIR), and after processing, feed or transmit the video image to the display: either each of the channels separately or the superimposed result.

The day-time channel can be achieved using a CCD camera with small aperture of the objective lens. Night vision channel can be obtained using a high-sensitivity CCD camera with increased objective lens aperture, not $I^2$ tubes. Since high-sensitivity CCD cameras can have lower sensitivity than $I^2$ tubes, the unit can have an integrated IR illuminator to aid in low-light conditions. In an embodiment, a thermal imaging sensor (e.g. those using microbolometer focal plane array or FPA) coupled to a Germanium objective lens is used to realize the thermal imaging channel.

In an embodiment, matching object's size seen through different channels (e.g., LWIR and VNIR, image scaling) can be overcome by using a varifocal (VF) objective lens, or a sensor camera lens whereby the magnification can change as focal length changes.

In yet another embodiment, the devices, systems and/or kits provided herein can be configured to display, for example, 3 single channel modes: day-time (purely visible wavelength), night-time (VNIR), thermal (LWIR) mode individually and/or also a fourth operational mode where both channels are superimposed (or fused). Such superposition is done in an analog-electronic way, rather than through digital or optical or dichoptic stimulation means.

The ECM disclosed can be configured to continuously and in real time, receive light level data from the ambient light sensor and based on user selection, either automatically (i.e. without user input or intervention) change night mode to day mode or vice-a-versa, or provide an indication to the user of the light level value if manual mode alteration option is selected by the user.

The system can be operated using any appropriate linking means, including but not limited to wireless, wire line, optical fiber, cable (e.g., RS232, Ethernet), RF, etc., or any suitable combination of the foregoing. The program code for carrying out operations for aspects of the present disclosure may be written in any combination of one or more programming languages, including an object oriented programming language such as Java™, Smalltalk, C++ or the like and conventional procedural programming languages, such as the "C" programming language or similar programming languages. The program code of the executable instructions disclosed, may be executed entirely on the processor, partly on the processor, or partly on the processor and partly on a remote processor, or entirely on a remote computer or server.

Furthermore, the disclosed and claimed technology or type of components can be configured to address requirements of low cost, portability (Vehicle mounted, personal weapons' mountable, hand held). Further, the proposed approach can even be extended to a wearable (helmet mounted, head mounted) version of the device, such as goggles. In addition, the devices, systems and kits disclosed and claimed can be configured to be user transformable—by easily installing uniform add-ons, comprising housing, battery compartment, keypad, display, eyepiece and connectivity ports, range finders, transceivers, or a combination of add-ons and peripherals comprising the foregoing. It should be noted, that display does not necessarily need to be fixed to the housing and could be located remotely and in general, can be operably coupled to the device.

Accordingly and in an embodiment, provided herein is a lightweight, portable imaging system comprising: a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the VNIR image sensor, the LWIR image sensor, the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal.

The VNIR imaging sensor (interchangeable with camera) and LWIR imaging sensors (interchangeable with camera) used in the systems, devices, kits and methods of the multi-mode optoelectronic observation and sighting system with cross-platform integration capability can each further be in communication with a separate analog video separation module (VS). Accordingly, composite analog signals arriving from the VNIR and LWIR sensors are detected by the video separation module. Further, to be usefully applied and used by the ECM, the synchronizing pulse information from a master signal source must be isolated from the composite video signal. This can be accomplished through the use of a sync separator, which utilizes the master composite video signal (e.g., the LWIR composite video signal) as an input and generates an output during the presence of a horizontal or vertical sync pulse. The sync pulses typically have voltage level, which falls beyond the permissible for of the video information, so the sync separator can be configured to operate as a type of threshold detector, producing an output when an input having an amplitude exceeding a predetermined level is present. In an embodiment, the synchronizing pulse separator used in the systems, methods and kits provided is configured to extract timing information including composite and vertical sync, burst or back porch timing, and odd and even field information from standard negative going sync NTSC, PAL and SECAM composite video signals.

The term "communicate" (and its derivatives e.g., a first component "communicates with" or "is in communication with" a second component) and grammatical variations thereof are used to indicate a structural, functional, mechanical, electrical, optical, or fluidic relationship, or any combination thereof, between two or more components or elements. As such, the fact that one component is said to communicate with a second component is not intended to exclude the possibility that additional components can be present between, and/or operatively associated or engaged with, the first and second components. Furthermore, the term "electronic communication" means that one or more components of the multi-mode optoelectronic observation and sighting system with cross-platform integration capability described herein are in wired or wireless communication or internet communication so that electronic signals and information can be exchanged between the components.

Likewise, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time. In an embodiment, an electronic control unit of the systems disclosed and claimed, is the electronic control module (ECM).

Further, the analog video mixer used in the systems, devices, kits and methods of the multi-mode optoelectronic observation and sighting system with cross-platform integration capability can comprise two or more voltage crossfaders and two or more voltage comparators. The crossfader can be configured to provide crossfading, signal multiplication, luma keying, chroma keying, window comparison, simple comparison or a combination of features comprising one or more of the foregoing. The analog video mixer (AVM) can, for example, provide X cross-fading, whereby the image component of a first video signal (e.g., that obtained from the VNIR image sensor) is reduced from a maximum value down to zero, while the image component of a second video signal (e.g., the LWIR image sensor) is at the same time raised from zero to its maximum value. The AVM can also provide V cross-fading. In the case of V cross-fading, the image component of a first video signal (e.g., that obtained from the VNIR image sensor) can be firstly reduced completely to zero before the image component of a second video signal (e.g., the LWIR image sensor) is increased. In an additional crossfading; "Λ", an inverted (reversed) V-type can be used, whereby the image component of a first video signal (e.g., that obtained from the LWIR image sensor) can be firstly brought to max before the image component of a second video signal (e.g., the VNIR image sensor) is decreased.

The systems, devices, kits and methods of the multi-mode optoelectronic observation and sighting system with cross-platform integration capability can further comprise a color video encoder (CVE), configured to receive a single analog video signal (RGB colorized video signal) from the AVM and a synchronizing pulse signal from the synchronizing pulse separator, the color video encoder being in communication with the display device.

The systems, devices, kits and methods of the multi-mode optoelectronic observation and sighting system with cross-platform integration capability can further comprise a first and second colorizing modules in communication with each of the VNIR imaging sensor and the LWIR imaging sensor respectively, configured to provide video signals having selectable, predetermined amplitude. These colorizing modules can have circuits (colorizing circuits, CC) that generate color information based on the video signal received from each of the first and second video separators and the control signals from the ECM. The colorizing modules relate in an embodiment to image processing methodologies and hardware, tailored specifically to provide color-enhanced vision. Traditional night vision systems typically display scene information in monochrome (traditionally green, although red or other colors are possible, as well) images that represent information found in the infrared (IR), or near infrared (NIR) which humans cannot see directly. Some color night vision systems attempt to improve upon traditional night vision systems by adding visible light information to the typical infrared (usually Thermal Infrared (TIR)) information, in order to create a more realistic image, to which the user can better relate. In an embodiment, the colorizing module can be configured to provide visible color information from an imaging sensor that is sensitive to at least part of the visible spectrum (e.g., VNIR), and infrared information obtained from an imagine sensor that is sensitive to at least part of the infrared spectrum (e.g., LWIR, as well as other infrared spectra).

In an embodiment, the methods described herein are implementable in the systems described. Accordingly and in another embodiment, provided herein is a method of analogously fusing two composite analog video signals to display visual images to a human observer, implementable in a system comprising a housing; a visible near infrared (VNIR)

imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal, the method comprising: using the VNIR imaging sensor (or camera) and the LWIR imaging sensor (or camera), obtaining a scene-captured image and generating an analog composite video signal from each of the VNIR imaging sensor (or camera) and the LWIR imaging sensor (or camera); using the synchronizing linking means, synchronizing the timing of the VNIR composite video signal to the LWIR composite video signal timings; correcting image parallax; separately colorizing the video signal obtained from the VNIR image sensor and the video signal obtained from the LWIR image sensor; using the analog video mixer, analogously mixing the separately colorized video signal obtained from the VNIR image sensor and the video signal obtained from the LWIR image sensor; feeding each of the mixed colorized video signals to the video encoder; and using the video display, displaying the mixed composite video signal.

The methods of analogously fusing two composite analog video signals to display visual images to a human observer described herein, can further comprise using the ambient light sensor to continuously and in real time feed the electronic control unit (or ECM module) with ambient light level value and using the processor in the electronic control module, determining the illumination level and/or timing of operating the infrared illuminator. In addition, the method of analogously fusing two composite analog video signals to display visual images to a human observer can further comprise a step of adjusting the focal length of the VNIR image sensor's lens and/or the focal length of the LWIR image sensor lens to provide an image of equal size, wherein the VNIR focal length is a slave to the LWIR image sensor's lens focal length. In an embodiment, the master-slave relation can be reversed. The master-slave interrelationship between the VNIR sensor (or camera), and the LWIR sensor (or camera) in terms of synchronization can be independent of the lens-adjusted image magnification. In an embodiment, pulse synchronization of the captured scene in the video channels, and which stream is used to feed into the ECM (e.g., to synchronize the on-screen display (OSD) stream), can be independent of the scene-captured image sizing synchronization, thus in another embodiment master-slave relations of scene capture sizing and the timing synchronization can be independently reversed.

Furthermore, correcting image parallax as performed in the methods of analogously fusing two composite analog video signal to display visual images to a human observer can further comprise performing X-Y image shifting in the LWIR image sensor (or camera) to correct potential parallax (referring to the apparent displacement or the difference in apparent direction of an object as seen from two different points not on a straight line with the object). The multi-mode optoelectronic observation and sighting system may have the VNIR objective optics physically offset by a fixed distance from the optical axis of the LWIR objective optics (lens), and/or the IR illuminator's center projection. At distances different from the predetermined distance imposed on the objectives at installation, parallax can cause a misalignment of the two images as viewed on the display. The parallax problem may exist if the objective optics are offset in the horizontal as well as the vertical directions. In an embodiment, the system can be configured to shift the scene-captured image of the LWIR image sensor (or camera) along X-Y plane coordinates to correct the parallax. It should be noted, the parallax correction does not need to take place in strict X-Y direction, but can be in any direction on the X-Y plane. In an embodiment, parallax correction is detected by the ECM, which can execute command to either the VNIR image sensor and/or the LWIR image sensor, to perform the image shifting procedure. In an embodiment, the ECM instructs the LWIR to execute image shifting to correct parallax.

In an embodiment, the image shifting can be done electronically in an image processing unit operable within the LWIR camera and can be controlled externally (by ECM) via linking means (401) and (402), such as a serial communications interface (e.g., rs-232), by providing the numbers of pixels by which the image is to be shifted horizontally and/or vertically. The image shifting may be otherwise expressed as view port remapping, referring to shifting the rectangle (or other field of view shape) of displayable pixels and mapping it over the composite video signal frames. Further the remapping may alternatively be done in the VNIR camera or in both.

Separately colorizing the video signals separated by the first and second video separators as performed in the methods of analogously fusing two composite analog video signals to display visual images to a human observer can further comprise feeding the composite video signal obtained from the VNIR image sensor into a VNIR video separator (i.e., the first VS) as described above, which can separate timing data, similarly feeding the composite video signal obtained from the LWIR image sensor into a LWIR video signal separator (i.e., the second VS). Separately, feeding the composite video signal obtained from the LWIR image sensor into a LWIR synchronizing pulse separator (SS), since in one embodiment, the LWIR is the master for sync purposes, producing the master sync source; feeding the pure video signal obtained from the first video separator into a VNIR colorizer (i.e., the first colorizing module having the first colorizing circuit—first CC); and feeding the pure video signal obtained from the LWIR image sensor into a LWIR colorizer (i.e., the second colorizing module having the second colorizing circuit—second CC).

Further, the analog video mixer can be configured to produce red-green-blue (RGB) colorized video signal, combining the RGB colorized video signals from VNIR and LWIR channels.

In an embodiment, the methods of analogously fusing two composite analog video signals to display visual images to a human observer, implementable in the multi-mode optoelectronic observation and sighting system described herein, can further comprise using the electronic control module (ECM), generating an on-screen display (OSD) RGB colorized video signal and feeding the OSD RGB colorized video signal into the analog video mixer (effectively creating a third channel); and internally synchronizing the OSD RGB colorized video signal with the synchronizing pulse signal isolated by the LWIR synchronizing pulse separator (or the VNIR synchronizing pulse signal isolated by a VNIR synchronizing pulse separator, if the master-slave relationship is reversed). The OSD RGB colorized video signal can be overlaid on the mixed RGB colorized video signals, or in another embodiment, on a single mode (channel) video RGB colorized signal (e.g., thermal, day or night) and be configured to display operator interactions' parameters, for example, instrument statuses, operation modes, messages or a combination of operator interactions comprising the foregoing.

The kits described herein can be assembled to the systems provided, which the methods described can be implemented. Accordingly and in an embodiment, provided herein is a kit comprising: a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal; optionally packaging; and optionally instruction, wherein the kit capable of being assembled to form the multi-mode optoelectronic observation and sighting system with cross-platform integration capability.

The terms "first," "second," and the like, when used herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the signal(s) includes one or more signal). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In addition, for the purposes of the present disclosure, directional or positional terms such as "top", "bottom", "upper," "lower," "side," "front," "frontal," "forward," "rear," "rearward," "back," "trailing," "above," "below," "left," "right," "radial," "vertical," "upward," "downward," "outer," "inner," "exterior," "interior," "intermediate," etc., are merely used for convenience in describing the various embodiments of the present disclosure.

The term "coupled", including its various forms such as "operably coupled", "coupling" or "coupleable", refers to and comprises any direct or indirect, structural coupling, connection or attachment, or adaptation or capability for such a direct or indirect structural or operational coupling, connection or attachment, including integrally formed components and components which are coupled via or through another component or by the forming process (e.g., an electromagnetic field). Indirect coupling may involve coupling through an intermediary member or adhesive, or abutting and otherwise resting against, whether frictionally (e.g., against a wall) or by separate means without any physical connection.

The term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

A more complete understanding of the components, processes, assemblies, and devices disclosed herein can be obtained by reference to the accompanying drawings. These figures (also referred to herein as "FIG.") are merely schematic representations (e.g., illustrations) based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Turning now to FIG. 1, illustrating a schematic view of an embodiment of the system's components architecture and their interrelationship. As illustrated, Object (A) image can be projected onto the image sensors of a VNIR camera (101) and a LWIR camera (201) via the lenses—(100) for VNIR and (200) for the LWIR. In an embodiment, lens (100) can be IR corrected lens. VNIR camera (101) can be a very sensitive (for example 0.0015 lux @ 50 IRE). VNIR camera (101) can be built around a true WDR (wide dynamic range) sensor (for example 120 db). VNIR camera (101) may be either monochrome or color. If a color camera is used, lens (100) can be configured to have electrically controlled IR block filter (100a) in order to preserve the colors in daylight and to allow IR radiation through in low light or IR aided night mode.

Both VNIR camera (101) and LWIR camera (201) generate analog composite video signals. The selection of analog composite video signal input combined with the analog mixing using analog video mixer is done as a measure to simplify the fusion of the input composite video signals solution, minimize the size of the overall device and lower the cost of the product.

In an embodiment, LWIR lens (200) can have fixed focal length, while VNIR lens (100) can be varifocal. By adjusting the focal length of VNIR lens (100) the produced image size can be adjusted to be equal to the image size produced by the LWIR camera (201). This approach allows to cut cost by eliminating the need of using electronic digital image scaling, which inevitably would involve an FPGA or other DSP or GPU solution. A person skilled in the art would recognize that it is not mandatory that VNIR lens (100) be the varifocal. Same effect can be achieved with varifocal LWIR lens (200).

As illustrated in FIG. 1, VNIR camera (101, or VNIR image sensor) and LWIR camera (201, or LWIR image sensor) generate analog composite video signals (102) and (202) respectively, containing the wavelength-specific information captured from image A in the scene. Also illustrated is SYNC link (300, a linking means) from LWIR camera (201) to the VNIR camera (101), which synchronizes VNIR video signal (102) timings to LWIR video stream (202). Linking means 300, allows in one embodiment for easy real time (latency-free) video stream combining, thus eliminating the need of the digitizing and frame buffering, which can lead to latency and increased cost of the video processing module.

In an embodiment, LWIR camera (201) is the master, providing synchronization timing to the slave VNIR camera (101). The master-slave relation can be reversed if the LWIR module (201) used can be configured to enable syncing to any external source.

The parallax compensation in the system illustrated can be done by X-Y image shifting in LWIR camera (201). Alternatively the image shifting can be performed using the VNIR camera (101) if the VNIR image sensor module supports such functionality. Following parallax correction, both composite video signals (102) and (202) are ready for mixing and can be configured to result in a perfectly overlapping, fused and synchronized video image of VNIR camera (101) scene and thermal signatures captured by LWIR camera (201).

To better distinguish between the information provided by VNIR and LWIR cameras (101, 201 respectively), composite video signals (102) and (202) are fed to first and second video separator circuits (103) and (203) respectively. LWIR composite video signal (202) alone can be fed to a synchronizing pulse separator circuit (301, SS), since LWIR composite video signal (202) is to be used as master source for providing sync baseline. First and second video separator (VS) circuits (103, 203) can be configured to produce pure video signals, in other words, free of sync pulses (104) and (204) respectively. Synchronizing pulse separator 301 can produce synchronizing pulse signal (302), which can be used further in reproducing a composite video for display. Pure video signals (104) and (204) can be fed to separate first and second colorization circuits in a colorizing module (CC) (105, or first CC for VNIR image sensor) and (205, or second CC for LWIR image sensor). Colorization circuits (105) and (205) can comprise resistive matrices and produce colorized RGB signals (106) and (206). Colorized RGB signals (106) and (206) can be controlled by electronic control module (400, ECM) and produce the selected color in RGB. Colorized RGB signals (106) and (206) can go through the first and second video fader (VF) channels (107) and (207), which controlled by the ECM, produce faded RGB video signals (108) and (208) with the desired amplitude, determined by the ECM (400).

Faded RGB signals (108) and (208) can next be mixed by the analog video mixer (500). Analog video mixer (AVM) (500) can comprise resistive adder circuit, which produces the fused RGB video signal (501), containing the images from VNIR (101) and/or LWIR (201) channels, or their fused combination. Another video signal that can enter analog video mixer (500) is OSD RGB colorized video signal (403), generated by the ECM (400). OSD (or On Screen Display) can be an overlaid indication for operator interaction (see e.g., FIG. 2). In order to be properly positioned on the video image, OSD video signal (403) is synchronized to the main sync signal source (302).

RGB (fused) video signal (501) together with synchronizing pulse signal (302) can then be fed to color video encoder (CVE) (502), having an output that can appear as standard composite (fused) video signal, ready to be displayed on a choice of standard monitor/display or further processing and or recording.

As further illustrated in FIG. 1, Ambient Light Sensor (600) feeds to ECM (400) information about the light conditions of the environment (or scene). ECM (400) in turn can be configured to decide whether to enable or disable the use of IR illuminator (700, IRI). In an embodiment, IRI (700) does not turn on automatically. It is explicitly user controllable in order to avoid unknown/unexpected and unwanted exposure to the opposing side. Use of IRI (700) is therefore a selectable feature of the system. The power of IRI (700) can be controlled by ECM (400), which is set by operator (800, not shown, see e.g., FIG. 2).

The system described herein can be switched to operate in any of the following modes:
Thermal imaging mode
Day mode
Night mode
Fusion mode In an embodiment, Fusion mode refers to a user-selectable mode, whereby both VNIR and LWIR derived images are combined, thus minimizing the disadvantages of each image sensor (or camera) alone by utilizing the advantages and complementing each other for composing a well-defined image, presenting useful information from both modes, thus aiding the operator to successfully detect and track objects at any light level, environmental and weather conditions.

Further, when a device comprising the system is in Thermal imaging mode, it can operate identically as a thermal imaging device. The default color for thermal imaging in gray scale, however there is a possibility the user may prefer and select one of the available pseudo-color schemes which, in an embodiment, are available with the current system as described in connection with the color circuits provided.

When device (10) is in day mode, IRI (700) can be disabled, VNIR lens (100) can be switched to a narrower aperture (iris), which can improve the depth of field of view. IR blocking filter (100a) can be positioned on the beam path, so VNIR camera (101) would pick properly scene colors. Ambient Light Sensor (ALS 600) can be configured to continuously be monitored by ECM (400) and if the scene illumination falls below or above a selectable, pre-set arbitrary thresholds, ECM (400) can generate an indication to that effect to the user (for example, in OSD signal 403), showing that device (10) may underperform if kept in its current mode. User (800) makes the decision whether to switch to a different mode, which would be more suitable for the observed scene under the circumstances. Alternatively, based on user selection, if the scene illumination exceeds or falls below or above the arbitrary threshold selected by the user, ECM (400) can automatically alter the mode of operation accordingly. Switching to thermal mode, or fusion mode can only be done through user input commands.

Conversely, in Night mode, ECM (400) can be configured to instruct color circuit on the first colorizing module (CC, 105) to produce a monochrome green tinted image. IRI (700) can then be enabled (activated) and operator (800, interchangeable with user, observer) can have the option to turn IRI (700) on and to adjust the intensity. ALS (600) can be configured to provide scene lightning information to ECM (400), which in turn would provide indication to the operator (e.g., through OSD colorized RGB video signal 403), that the use of the currently selected mode is no longer required or advised once the scene illumination is above or below the selectable pre-set arbitrary thresholds. The level of light intensity at which the ECM reacts can depend on the sensitivity of the VNIR camera used and a matter of calibration, determined by measuring the signal-to-noise-ratio (SNR) of the VNIR camera. Pre-selecting a desired camera SNR (for example 25 db) can be used to set the ALS threshold level.

Green colorization can be selected with two considerations in mind: One is to make it look like the native I²T (Image Intensifier Tube), which typically produces a green monochrome image. Second, is that the night time human eye's sensitivity maximum is around the green wave length (e.g., between about 505 nm to about 555 nm) and since the night scene does not provide color information, being monochrome it can be advantageous to display shades of green rather than shades of gray. Accordingly, in another embodiment, monochrome display of thermal image, or night vision image can be displayed at a wavelength range of between about 450 nm and about 550 nm, by converting gray scale to green scale based on analog luma data obtained from the pure video signal provided by the video separator.

Alternatively, in Fusion mode operator (800) can be presented with a combined image including details from VNIR and the LWIR cameras (101, 201 respectively). The fusion mode can work in both Day Fusion (DF) and Night Fusion (NF) modes. DF and NF modes can be either switched over automatically (in other words, without operator 800 intervention) with the input from ALS (600), with a certain hysteresis or delay, or selectably by operator (800) when based on personal preference or subjective perception of scene details. IRI (700) availability and lens IR block filter (100a) control can remain the same as outlined hereinabove for Day and Night Modes. Same applies for ALS (600) based suggestive indications provided in another embodiment by ECM (400).

Accordingly, in Fusion Mode, warm objects can be accented with shades of orange. In an embodiment, orange may be selected as a color because it is a warm color and subconsciously is being related to warmth, and is less of an eye-irritant than red. The intensity and saturation levels of the orange color can be configured to be proportional to the heat radiation intensity emitted by the objects in the scene, sensed and separated in luma data by the video separator(s).

As mentioned hereinabove, in Fusion Mode certain parallax error may occur. The parallax can be compensated by shifting the image (in other words, remapping of the sensor scanning area), in either VNIR camera (101) or LWIR camera (201). A person skilled in the art would recognize that technically there is no difference which would be used to accommodate the parallax compensation. In an embodiment, it is possible to realize the compensation automatically, based on a lens (100, 200) focusing feedback by determining the distance to object A. In an embodiment, parallax correction as described herein is performed by operator (800) by manual correction, lowering costs, complexity and space requirements. (Lenses with focusing distance feedback are significantly more expensive). In addition, in Fusion Mode, the LWIR channel has mainly an aiding function to highlight warm/hot objects in order to improve the detecting capabilities of the system. The parallax error becomes very small and insignificant beyond a certain distance. Therefore a small parallax error may not be considered an issue and an expensive automated compensation may not be justified.

ECM (400) can be operably coupled and maintain communication with panel connector C (504). Panel connector C (504) can provide connectivity for monitoring display (1004, see e.g., FIG. 2 and/or recorder or computerized data collection/processing system and the like) and external remote control keypad (1002, see e.g., FIG. 2).

As indicated above, the multi-mode optoelectronic observation and sighting system with cross-platform integration capability can be configured to alternate between day mode and night mode automatically, based on light level input provided continuously by ALS (600) to ECM (400). ECM (400) can sample the light level values obtained from ALS (600) at a selectable, pre-determined rate of, for example, between about 0.1 Hz and about 5.0 Hz. Depending on time (during the 24 hour cycle), environmental conditions, observation azimuth, velocity of movement, foliage and other factors comprising the foregoing, light levels may vary drastically. Accordingly, in an embodiment, when operation mode alteration is selected as automatic, hysteresis levels (in other words, the difference between actual light level and threshold levels) and mode alteration delay timing, can be adjusted by the user, to prevent flickering. In an embodiment, thermal imaging and fusion (DF, NF) modes can only be selected by the user and not altered automatically.

Turning now to FIG. 2, illustrating an embodiment the Transforming Attachment (TA) accessory, which can convert device (10) to a standalone autonomous portable unit, which can also be mounted on a weapon via a standard interface. In another embodiment, the add-on attachment can be constructed as a binocular/goggle with the difference of containing two micro displays, coupled with eyepieces. The attachment is designed in such a way, so it is intuitively bolt-on easy to install by end user without the need of any special training.

As illustrated in FIG. 2, the TA can comprise:
housing (1001) containing the necessary elements
keypad (1002) for operator control
battery pack compartment (1003) providing autonomy
micro display (1004) coupled with the eyepiece
eyepiece (1005) for the operator
connectors (1006) for remote control, video output and communication
linking means connections (1007) for connecting it to the main unit Accordingly and in an embodiment, provided herein is a lightweight, portable imaging system comprising: a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the VNIR image sensor, the LWIR image sensor, the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect; as well as provide the analog video mixer with a colorized on-screen display video signal, wherein (i) the VNIR imaging sensor and LWIR imaging sensors are each further in communication with a separate analog video separation module, wherein (ii) the analog video mixer comprises at least three inputs, the analog video mixer configured to provide a single colorized fused video signal (iii) further comprising a color video encoder, configured to receive a single analog pure video signal from the analog video mixer, the color video encoder being in communication with the display device, (iv) further comprising a keypad, in communication with the processing module, wherein (v) the ECM further comprises a set of instructions configured to control the intensity of the infrared illuminator, control the colorization circuits, the video faders, provide OSD indications and receive ambient light data from the ALS, (vi) further comprising a portable power source, (vii) further comprising colorizing modules in communication with each of the VNIR imaging sensor and the LWIR imaging sensor, configured to provide video signals having selectable, predetermined amplitude (viii) and a goggle, a sighting device, a vehicle mounted imaging device, a wearable device or a combination device comprising one or more of the forgoing, comprising any embodiment of the systems described herein.

In another embodiment, provided herein is a method of analogously fusing two composite analog video signals to display visual images to a human observer, implementable in a system comprising a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal, the method comprising: using the VNIR imaging sensor and the LWIR imaging sensor, obtaining an image and generating an analog composite video signal from each of the VNIR imaging sensor and the LWIR imaging sensor; using the synchronizing linking means, synchronizing the timing of the VNIR composite video signal to the LWIR composite video signal timings; correcting image parallax; separately colorizing the video signal obtained from the VNIR image sensor and the video signal obtained from the LWIR image sensor; using the analog video mixer, analogously mixing the separately colorized video signals obtained from the VNIR image sensor and the video signal obtained from the LWIR image sensor; feeding the mixed colorized video signals to a video encoder; and using the video display, displaying the mixed composite video signals, the method (ix) further comprising: using the ambient light sensor, continuously feeding the ECM with ambient light level value; and using the processor in the electronic control module, determining the illumination level and/or timing of operating the infrared illuminator (x) adjusting the focal length of the VNIR image sensor lens and/or the focal length of the LWIR image sensor lens to provide an image of equal size, wherein (xi) the VNIR image sensor lens focal length is a slave to the LWIR image sensor lens' focal length, wherein (xii) correcting image parallax comprises performing X-Y image shifting in the LWIR image sensor, wherein (xiii) separately colorizing the video stream and video signal comprises: feeding the composite video signal obtained from the VNIR image sensor into a VNIR video separator producing a pure video signal; feeding the composite video signal obtained from the LWIR image sensor into a LWIR video signal separator producing a pure video signal; feeding the composite video signal obtained from the LWIR image sensor into a LWIR synchronizing pulse separator;

feeding the separated pure video signal obtained from the VNIR image sensor into a VNIR colorizer; and feeding the separated pure video signal obtained from the LWIR image sensor into a LWIR colorizer, wherein (xiv) the analog video mixer produces a fused RGB video signal, (xv) further comprising ECM, generating an on-screen display RGB colorized video signal (OSD); feeding the OSD colorized video signal into the analog video mixer; and synchronizing the OSD composite video signal with the synchronizing pulse video signal separated by the LWIR synchronizing pulse separator (xvi) the OSD RGB colorized video signal is overlaid on the mixed RGB colorized video signals from the VNIR image sensor and the LWIR image sensor, configured to display operator interactions parameters, (xvii) wherein the operator interactions display comprise: instrument statuses, operation modes, messages or a combination of operator interactions comprising the foregoing.

In yet another embodiment, provided herein is a kit comprising: a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; an electronic control module (or ECM module) in communication with the VNIR image sensor, the LWIR image sensor, the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal; optionally packaging; and optionally instruction, the kit capable of being assembled to form a multi-mode optoelectronic observation and sighting system with cross-platform integration capability; (xviii) to be used in a goggle, a sighting device, a vehicle mounted imaging device, a wearable device or a combination device comprising one or more of the forgoing.

In addition to the uses described herein, the multi-mode optoelectronic observation and sighting system with cross-platform integration capability described herein can be incorporated into a variety of other useful apparatuses. For instance, into the head light of commercial vehicles, rear-looking car cameras and the like. Those skilled in the art will readily conceive of still other apparatus configurations in which the multi-mode optoelectronic observation and sighting system with cross-platform integration capability described can be used.

The present technology is described as a multi-mode optoelectronic observation and sighting system with cross-platform integration capability. It will be understood, however, that the description provided hereinabove is merely illustrative of the application of the principles of the disclosed and claimed technology, the scope of which is to be determined by the claims viewed in light of the specification and figures. Other variants and modifications of the disclosed technology will be readily apparent to those skilled in the art.

What is claimed:

1. A lightweight, portable imaging system comprising:
   a. a housing;
   b. a visible near infrared (VNIR) imaging sensor disposed at least partially within the housing having a variable focal length lens;
   c. a long wave infrared radiation (LWIR) imaging sensor disposed at least partially within the housing, having a fixed, or variable focal length lens, the LWIR image sensor being in communication with the VNIR image sensor via a synchronizing linking means;
   d. a first video separator, a first colorizing module and a first video fader in communication with the VNIR image sensor;
   e. a second video separator, a synchronizing pulse separator, a second colorizing module and a second video fader in communication with the LWIR image sensor;
   f. an ambient light sensor;
   g. an infrared illuminator;
   h. a display device configured for displaying visual images to a human observer;
   i. an analog video mixer; and
   j. an electronic control module (or ECM module) in communication with the VNIR image sensor, the LWIR image sensor, the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect; as well as provide the analog video mixer with a colorized on-screen display video signal.

2. The system of claim 1, wherein the VNIR imaging sensor and LWIR imaging sensors are each further in communication with a separate analog video separation module.

3. The system of claim 1, wherein the analog video mixer comprises at least three inputs, the analog video mixer configured to provide a single colorized fused video signal.

4. The system of claim 3, further comprising a color video encoder, configured to receive a single analog pure video signal from the analog video mixer, the color video encoder being in communication with the display device.

5. The system of claim 1, further comprising a keypad, in communication with the electrical control module.

6. The system of claim 5, wherein the ECM further comprises a set of instructions configured to control the intensity of the infrared illuminator, control the colorization circuits, the video faders, provide OSD indications and receive ambient light data from the ALS.

7. The system of claim 1, further comprising a portable power source.

8. The system of claim 1, further comprising colorizing modules in communication with each of the VNIR imaging sensor and the LWIR imaging sensor, configured to provide video signals having selectable, predetermined amplitude.

9. A goggle, a sighting device, a vehicle mounted imaging device, a wearable device or a combination device comprising one or more of the forgoing, comprising the system of claim 1.

10. A method of analogously fusing two composite analog video signals to display visual images to a human observer, implementable in a system comprising a housing; a visible near infrared (VNIR) imaging sensor disposed at least partially within the housing having a variable focal length lens; a long wave infrared radiation (LWIR) imaging sensor disposed at least partially within the housing, having a fixed, or variable focal length lens, the LWIR image sensor being in communication with the VNIR image sensor via a synchronizing linking means; a first video separator, a first colorizing module and a first video fader in communication with the VNIR image sensor; a second video separator, a synchronizing pulse separator, a second colorizing module and a second video fader in communication with the LWIR image sensor; an ambient light sensor; an infrared illuminator; a display device configured for displaying visual images to a human observer; an analog video mixer; and an electronic control module (or ECM module) in communication with the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal, the method comprising:
    a. using the VNIR imaging sensor and the LWIR imaging sensor, obtaining an image and generating an analog composite video signal from each of the VNIR imaging sensor and the LWIR imaging sensor;
    b. using the synchronizing linking means, synchronizing the timing of the VNIR composite video signal to the LWIR composite video signal timings;
    c. correcting image parallax;
    d. separately colorizing the video signal obtained from the VNIR image sensor and the video signal obtained from the LWIR image sensor;
    e. using the analog video mixer, analogously mixing the separately colorized video signals obtained from the VNIR image sensor and the video signal obtained from the LWIR image sensor;
    f. feeding the mixed colorized video signals to a video encoder; and
    g. using the video display, displaying the mixed composite video signals.

11. The method of claim 10, further comprising:
    a. using the ambient light sensor, continuously feeding the ECM with ambient light level value; and
    b. using the processor in the electronic control module, determining the illumination level and/or timing of operating the infrared illuminator.

12. The method of claim 10, further comprises adjusting the focal length of the VNIR image sensor lens and/or the focal length of the LWIR image sensor lens to provide an image of equal size.

13. The method of claim 12, wherein the VNIR image sensor lens focal length is a slave to the LWIR image sensor lens' focal length.

14. The method of claim 13, wherein correcting image parallax comprises performing X-Y image shifting in the LWIR image sensor.

15. The method of claim 14, wherein separately colorizing the video stream and video signal comprises:
    a. feeding the composite video signal obtained from the VNIR image sensor into a VNIR video separator producing a pure video signal;
    b. feeding the composite video signal obtained from the LWIR image sensor into a LWIR video signal separator producing a pure video signal;
    c. feeding the composite video signal obtained from the LWIR image sensor into a LWIR synchronizing pulse separator;
    d. feeding the separated pure video signal obtained from the VNIR image sensor into a VNIR colorizer; and
    e. feeding the separated pure video signal obtained from the LWIR image sensor into a LWIR colorizer.

16. The method of claim 15, wherein the analog video mixer produces a fused RGB video signal.

17. The method of claim 16, further comprising:
    a. ECM, generating an on-screen display RGB colorized video signal (OSD); and
    b. feeding the OSD colorized video signal into the analog video mixer; and
    c. synchronizing the OSD composite video signal with the synchronizing pulse video signal separated by the LWIR synchronizing pulse separator.

18. The method of claim 17, wherein the OSD RGB colorized video signal is overlaid on the mixed RGB colorized video signals from the VNIR image sensor and the LWIR image sensor, configured to display operator interactions parameters.

19. The method of claim 18, wherein the operator interactions display comprise: instrument statuses, operation modes, messages or a combination of operator interactions comprising the foregoing.

20. A kit comprising:
    a. a housing;
    b. a visible near infrared (VNIR) imaging sensor disposed at least partially within the housing having a variable focal length lens;
    c. a long wave infrared radiation (LWIR) imaging sensor disposed at least partially within the housing, having a fixed, or variable focal length lens, the LWIR image sensor being in communication with the VNIR image sensor via a synchronizing linking means;
    d. a first video separator, a first colorizing module and a first video fader in communication with the VNIR image sensor;
    e. a second video separator, a synchronizing pulse separator, a second colorizing module and a second video fader in communication with the LWIR image sensor;
    f. an ambient light sensor;
    g. an infrared illuminator;
    h. a display device configured for displaying visual images to a human observer;
    i. an analog video mixer;
    j. an electronic control module (or ECM module) in communication with the VNIR image sensor, the LWIR image sensor, the ambient light sensor, the infrared illuminator, the synchronizing pulse separator, the first and second colorizing module, the first and second video fader, the display and the analog video mixer, wherein the electronic control module (or ECM) having a processor with a set of executable instructions thereon configured to: receive light level values from the ambient light sensor, synchronize itself to a master sync source received from the synchronizing pulse separator, and for processing user input data; and if a light level obtained from the light sensor is below or above selectable predetermined thresholds, alter an operation mode, or provide the user with an indication to that effect (in other words, that the threshold light level has been reached), as well as provide the analog video mixer with a colorized on-screen display video signal;

k. optionally packaging; and
l. optionally instruction,
the kit capable of being assembled to form a multi-mode optoelectronic observation and sighting system with cross-platform integration capability.

\* \* \* \* \*

UNITED STATES PATENT AND TRADEMARK OFFICE
CERTIFICATE OF CORRECTION

PATENT NO.       : 9,648,255 B2
APPLICATION NO.  : 14/852283
DATED            : May 9, 2017
INVENTOR(S)      : Simon Chenderovitch and Ivan Petrov Page 1 of 1

It is certified that error appears in the above-identified patent and that said Letters Patent is hereby corrected as shown below:

(72) Inventors:
Simon Chenderovich name has been misspelled and should be corrected to:
Simon Chenderovitch Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*